J. BAUMEISTER.
Domestic Boiler.

No. 67,939.  
Patented Aug. 20, 1867.

WITNESSES:  
Theo Fusche  
Wm Frewin

INVENTOR:  
John Baumeister  
Per Munn & Co  
Attorneys

United States Patent Office.

JOHN BAUMEISTER, OF DETROIT, MICHIGAN.

Letters Patent No. 67,939, dated August 20, 1867.

IMPROVEMENT IN BOILERS.

*The Schedule referred to in these Letters Patent and making part of the same.*

TO ALL WHOM IT MAY CONCERN:

Be it known that I, JOHN BAUMEISTER, of Detroit, in the county of Wayne, and State of Michigan, have invented a new and improved Strainer and Cooking Apparatus; and I do hereby declare that the following is a full, clear, and exact description thereof, which will enable others skilled in the art to make and use the same, reference being had to the accompanying drawings, forming part of this specification.

This invention relates to a new and improved arrangement for cooking purposes; and it consists in arranging vessels with perforated bottoms over a boiler, and in strainers without bottom, which are placed in the said vessels in the manner hereinafter described.

Similar letters of reference indicate like parts.

Figure 2:
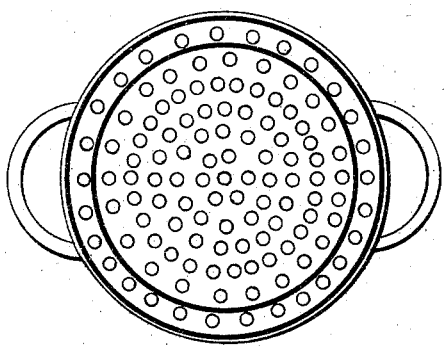
Figure 2 is a cross-section of the same, showing the bottom of one of the vessels.
Figure 1:
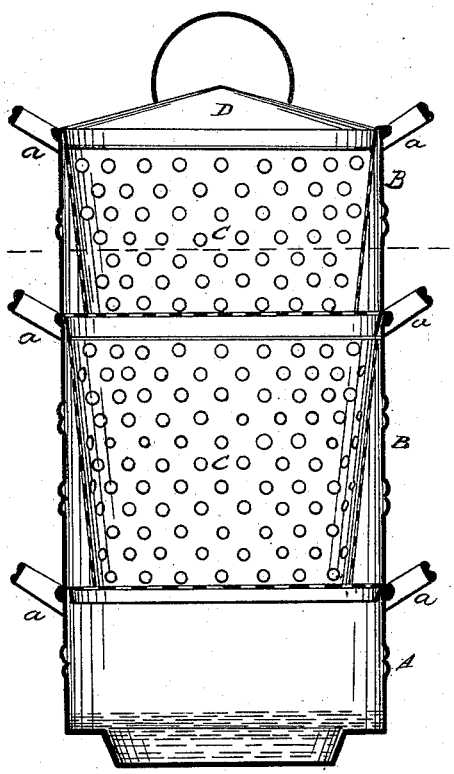
Figure 1 represents a central vertical section of the arrangement, showing the vessels on the boiler and the strainer in place.

A represents a boiler of the ordinary kind, constructed to fit on to a stove in the usual manner. B represents the vessels, which are of the same, or nearly the same, diameter as the boiler, which fit into the boiler and into each other, as seen in the drawing. There may be more or less of these vessels, but two would perhaps be sufficient. These vessels have perforated bottoms, as seen in fig. 2, with handles attached, marked $a$. In each of the vessels B, suspended by a flange from the top, there is placed a perforated strainer without a bottom. C represents these strainers. They are dropped into the vessel loosely, and are easily removed for cleaning or other purposes. D is a cover over the upper vessel.

Meats or vegetables, or other articles, are placed in the vessels for steaming, and articles of different kinds may be cooked at the same time in the different vessels. When the cooking is completed the vessels, with the strainers, are taken from the boiler, with the contents in a much more suitable condition for the table than they would have been if they had been immersed in water.

By arranging the strainers in this manner there is no difficulty in cleaning, as they are readily taken from the vessels for that or other purposes.

What I claim as new, and desire to secure by Letters Patent, is—

The strainer C, constructed and arranged substantially as described, in combination with the vessel B and the boiler A, for the purposes set forth.

JOHN BAUMEISTER.

Witnesses:
  EUGENE FECHT,
  ANTHONY THELEN.